US009002703B1

United States Patent
Crosley

(10) Patent No.: US 9,002,703 B1
(45) Date of Patent: Apr. 7, 2015

(54) COMMUNITY AUDIO NARRATION GENERATION

(75) Inventor: Jay A. Crosley, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 624 days.

(21) Appl. No.: 13/247,863

(22) Filed: Sep. 28, 2011

(51) Int. Cl.
*G10L 21/00* (2013.01)
*G10L 25/90* (2013.01)
*G10L 15/26* (2006.01)

(52) U.S. Cl.
CPC ..................................... *G10L 15/26* (2013.01)

(58) Field of Classification Search
None
See application file for complete search history.

(56) References Cited

U.S. PATENT DOCUMENTS

| | | | | |
|---|---|---|---|---|
| 6,791,529 B2 * | 9/2004 | Shteyn | | 345/156 |
| 2005/0234958 A1 * | 10/2005 | Sipusic et al. | | 707/102 |
| 2006/0116877 A1 * | 6/2006 | Pickering et al. | | 704/231 |
| 2008/0120312 A1 * | 5/2008 | Reed et al. | | 707/100 |
| 2008/0141180 A1 * | 6/2008 | Reed et al. | | 715/854 |
| 2009/0099919 A1 * | 4/2009 | Schultheiss et al. | | 705/14 |
| 2009/0202226 A1 * | 8/2009 | McKay | | 386/104 |
| 2009/0326948 A1 * | 12/2009 | Agarwal et al. | | 704/260 |
| 2010/0050064 A1 * | 2/2010 | Liu et al. | | 715/202 |
| 2011/0106283 A1 * | 5/2011 | Robinson | | 700/94 |
| 2011/0122170 A1 * | 5/2011 | Kim et al. | | 345/690 |
| 2011/0124264 A1 * | 5/2011 | Garbos | | 446/147 |
| 2011/0153330 A1 * | 6/2011 | Yazdani et al. | | 704/260 |
| 2011/0167390 A1 * | 7/2011 | Reed et al. | | 715/854 |
| 2011/0313757 A1 * | 12/2011 | Hoover et al. | | 704/9 |
| 2012/0191457 A1 * | 7/2012 | Minnis et al. | | 704/260 |
| 2012/0311625 A1 * | 12/2012 | Nandi | | 725/28 |
| 2013/0124202 A1 * | 5/2013 | Chang | | 704/235 |

* cited by examiner

*Primary Examiner* — Richemond Dorvil
*Assistant Examiner* — Thuykhanh Le
(74) *Attorney, Agent, or Firm* — Lee & Hayes, PLLC

(57) ABSTRACT

The community-based generation of audio narrations for a text-based work leverages collaboration of a community of people to provide human-voiced audio readings. During the community-based generation, a collection of audio recordings for the text-based work may be collected from multiple human readers in a community. An audio recording for each section in the text-based work may be selected from the collection of audio recordings. The selected audio recordings may be then combined to produce an audio reading of at least a portion of the text-based work.

30 Claims, 10 Drawing Sheets

COMMUNITY AUDIO NARRATION GENERATION

BACKGROUND

Content is increasingly being distributed in electronic form for consumption on electronic devices. Digital content may be an electronic version of various creative works, such as books, magazines, newspapers, newsletters, manuals, guides, references, articles, reports, documents, and the like. In many instances, rather than using electronic devices to view such digital content, users are increasingly relying on their electronic devices to read audio versions of such digital content to them. However, since not all digital content comes with a corresponding audio version, users may be unable to enjoy some digital content while performing other tasks, such as driving, walking, or running. Some electronic devices may have the ability to use text-to-speech technology to convert digital content that is in written form to synthesized speech. Nevertheless, such synthesized speech often sounds unnatural and stilted when compared to audio versions of digital content that are read by human narrators.

Further, some authors of digital content may lack the resources to hire human narrators to produce audio versions of their creative works. Accordingly, such authors may be forced to rely on text-to-speech technology to produce computer-synthesized audio versions of their work. Such computer-synthesized audio versions may not accurately convey the emotional or literary impact of the original digital content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The disclosure is directed to techniques for obtaining audio readings of text-based works from a community of readers. The techniques may leverage mass collaboration by a community of people, such as consumers of text-based works, to contribute audio readings of the text-based works. Text-based works may be electronic versions of various creative works, such as books, magazines, newspapers, newsletters, manuals, guides, references, articles, reports, documents, and the like. In this way, audio readings of text-based works may be produced without reliance on the use of professional human book readers or narrators, such as an author of a text-based work. Further, self-publishing content providers may be able to produce audio versions of their text-based works at little or no cost. Additionally, user satisfaction during interaction with text-based works on electronic devices may be improved as users are subject to fewer uses of text-to-speech technology built into the electronic devices that produce unnatural sounding audio readings of the text-based works.

In various embodiments, a collection of audio recordings for a corresponding text-based work may be collected and stored. An audio recording for each section in the text-based work may be selected from the collection of audio recordings. The selected audio recordings may be combined to produce an audio reading of at least a portion of the text-based work. The audio reading may then be provided with the text-based work to produce an integrated product that is provided to users. The audio reading may also be provided as a separate item than the text-based work.

An illustrative environment and techniques for generating community audio readings of text-based works are described below. However, the described community audio reading generation techniques may be implemented in other environments.

Illustrative System Architecture

Figure 1:
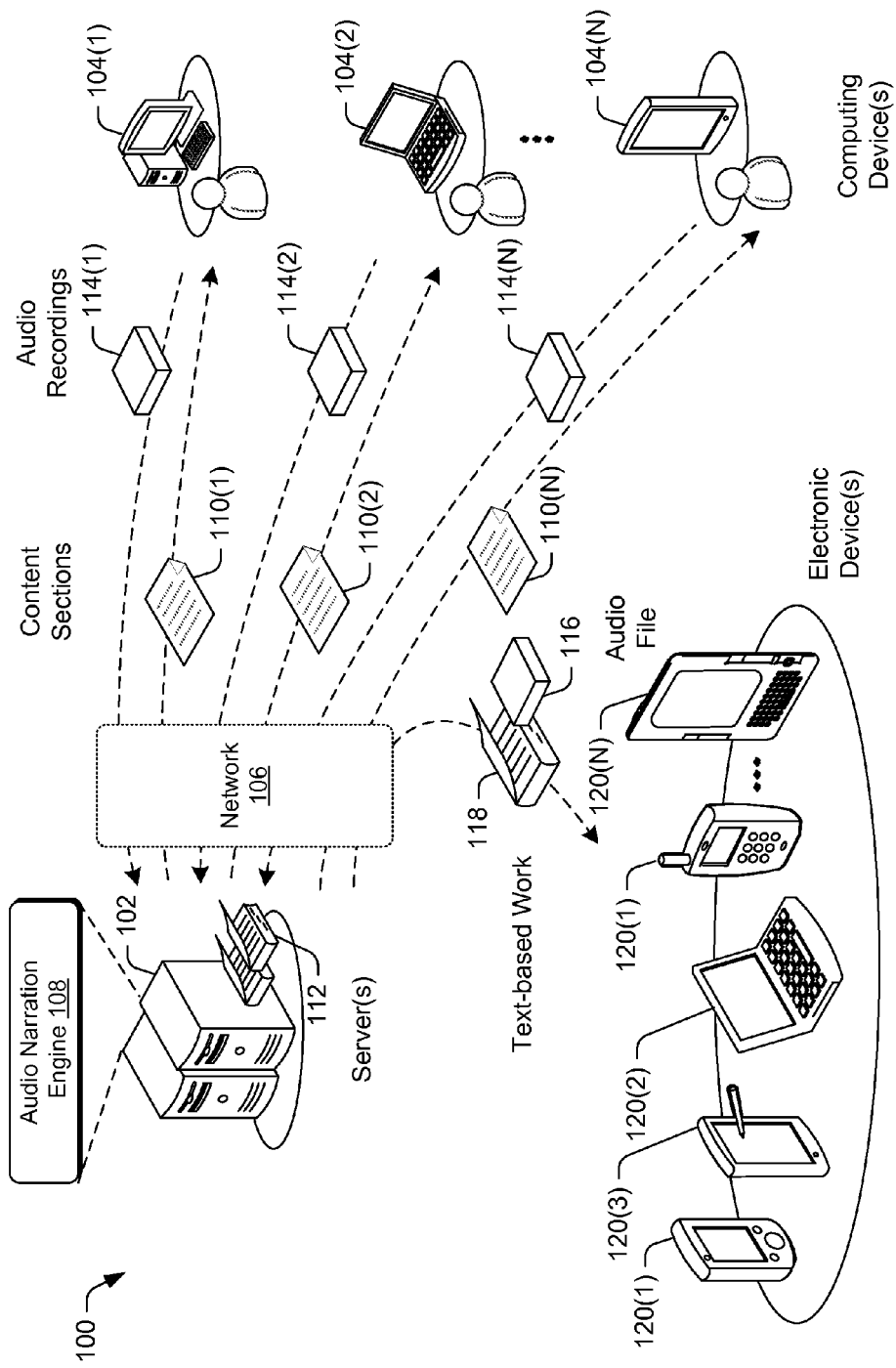
FIG. 1 is a schematic diagram of an illustrative computing environment for implementing various embodiments of community audio narration generation.

FIG. 1 is a schematic diagram of an illustrative computing environment 100 for implementing various embodiments of community audio narration generation. The computing environment 100 may include server(s) 102 and a plurality of computing devices 104(1)-104(N) that are communicatively connected by a network 106. The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

An audio narration engine 108 on the server(s) 102 may use the network 106 to present content sections 110(1)-110(N) of text-based works 112 to human readers at the computing devices 104(1)-104(N). Each of the computing devices 104(1)-104(N) may include a display component and an audio input and transmission component, such as a microphone and hardware and/or software that support voice over Internet Protocol (VoIP). Each of the computing devices 104(1)-104(N) may further include a web browser that enables a corresponding reader to navigate to a web page presented by the audio narration engine 108. Each web page may present a series of content sections to be read out loud by a corresponding human reader. In some instances, the audio narration engine 108 may send the same content section or content sections with overlapping content material to multiple readers. In turn, the reading of the content sections by each human reader may be captured by the audio input and transmission component of a corresponding computing device (e.g., computing device 104(1)) and transmitted back to the audio narration engine 108 as audio recordings 114(1)-114(N).

Upon receiving each audio recording, the audio narration engine 108 may tag the audio recording with associated metadata. The associated metadata may include profile information about the human reader that produced the audio recording, as well as information on the identity of the text-based work (e.g., title, edition, publisher, year of publication, etc.) and the content section in the text-based work that corresponds to the audio recording (e.g., pages, rows, columns, and/or chapters).

For each text-based work, the audio narration engine 108 may further analyze the audio recordings based on the metadata of the audio recordings and a series of selection criteria. In at least one embodiment, the selection criteria may include a harmony of a voice in each audio recording with the voices in other audio recordings, the rating of each audio recording, and/or so forth. Based on the analysis, the audio narration engine 108 may select and combine a group of the related audio recordings to generate one or more audio files or otherwise associated the group of audio recordings with each other. The audio file may include a reading of an entire text-based work, or at least a portion of the text-based work. For example, the audio narration engine 108 may produce an audio file 116 that accompanies text-based work 118 from at least some of the audio recordings 114(1)-114(N).

The audio narration engine 108 may further include each audio file with its counterpart text-based work for distribution to a plurality of electronic devices 120(1)-120(N) for consumption by users. For example, the audio file 116 may be integrated with the text-based work 118 to produce an integrated product. The audio narration engine 108 may then distribute the integrated product to the electronic devices 120(1)-120(N). In other embodiments, the audio narration engine 108 may provide the audio file 116 separately from the text-based work to the electronic devices 120(1)-120(N).

In various embodiments, the electronic devices may include a mobile phone 120(1), a portable computer 120(2), a tablet computer 120(3), and an electronic book reader device (or, an "eBook reader device") 120(N). Each of the electronic devices 120(1)-120(N) may have software and hardware components that enable the display of the content sections of a text-based work, the output of audio according to an audio file counterpart to the text-based work, or the simultaneous display of each section of a text-based work with the playback of a matching portion of the counterpart audio file.

However, the electronic devices 120(1)-120(N) are merely examples, and other electronic devices that are equipped with network communication components, data processing components, electronic displays for displaying data, and audio output capabilities may be employed.

Example Server Modules

Figure 2:
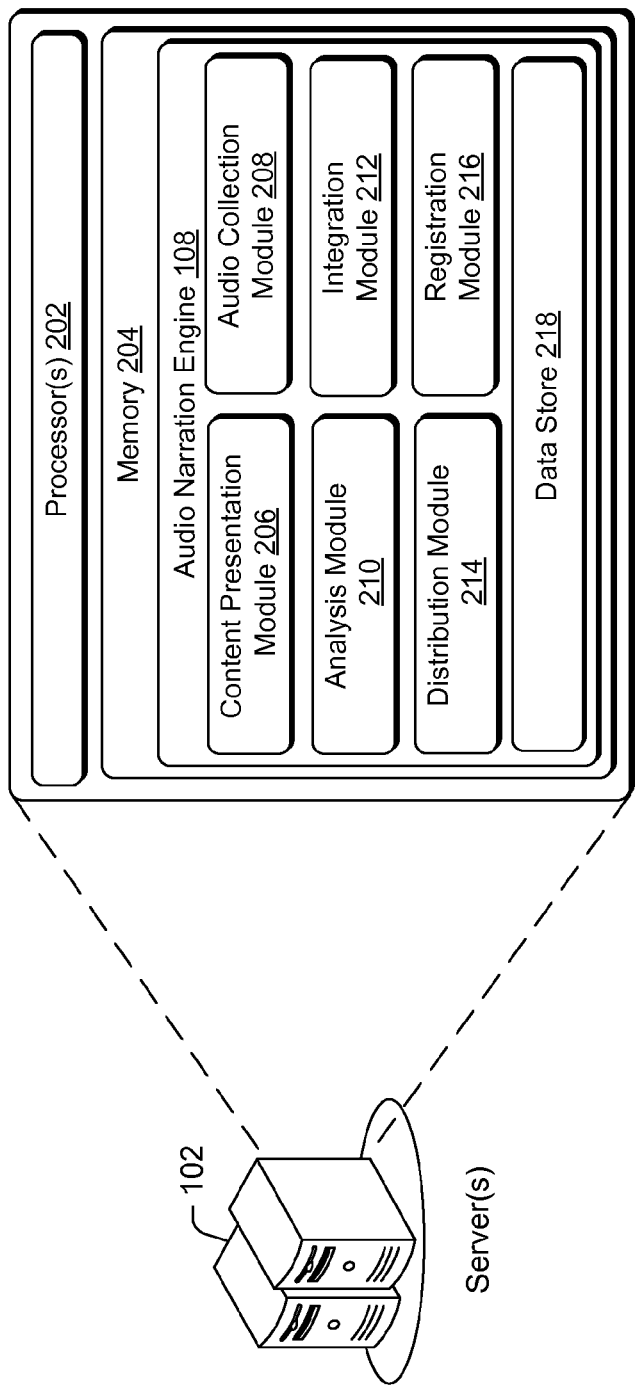
FIG. 2 is a schematic diagram of illustrative components in an example audio narration engine that is used to generate audio narrations of text-based works.

FIG. 2 is a schematic diagram of illustrative components in an example audio narration engine 108 that is used to generate audio narrations of text-based works. The audio narration engine 108 may be implemented by the server(s) 102. The server(s) 102 may include processor(s) 202 and memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The audio narration engine 108 may include a content presentation module 206, an audio collection module 208, an analysis module 210, an integration module 212, a distribution module 214, and a registration module 216. The modules may include routines, programs instructions, objects, and/or data structures that perform particular tasks or implement particular abstract data types. The server(s) 102 may also implement a data store 218 that stores data used by the audio narration engine 108.

The content presentation module 206 may enable a human reader to select text-based works for the purpose of providing audio readings. In various embodiments, the content presentation module 206 may present a web page to a human reader that enables the human reader to select a particular text-based work from the multiple text-based works 112. Once the human reader has selected a particular text-based work, the content presentation module 206 may further present sections of the selected text-based work to the human reader so that the human reader may provide an audio reading for one or more sections.

The audio collection module 208 may collect audio recordings of content readings by human readers. Additionally, the audio collection module 208 may label each audio recording with metadata. The metadata may include information regarding the identification of the text-based work, as well as the content section in the text-based work to which the audio recording corresponds. The metadata for an audio recording may include identification information supplied by the content presentation module 206 to the audio collection module 208 in embodiments in which the content presentation module 206 originally presented a corresponding content section for reading by a human reader. In such embodiments, the content presentation module 206 may track the identification information of each content section that is presented to human readers for reading. The metadata may further include profile information on the human reader that submitted the audio recording.

The analysis module 210 may be used by the audio collection module 208 to determine whether a collected audio recording meets certain quality criteria. In various embodiments, the quality criteria may include whether a background noise level in the audio recording is below a maximum noise level, whether spoken words in the audio recording actually comports with text in the corresponding text-based work section, and/or so forth. The operations performed by the modules 206-210 of the audio narration engine 108 may be further described with respect to FIGS. 3 and 4.

Figure 3:
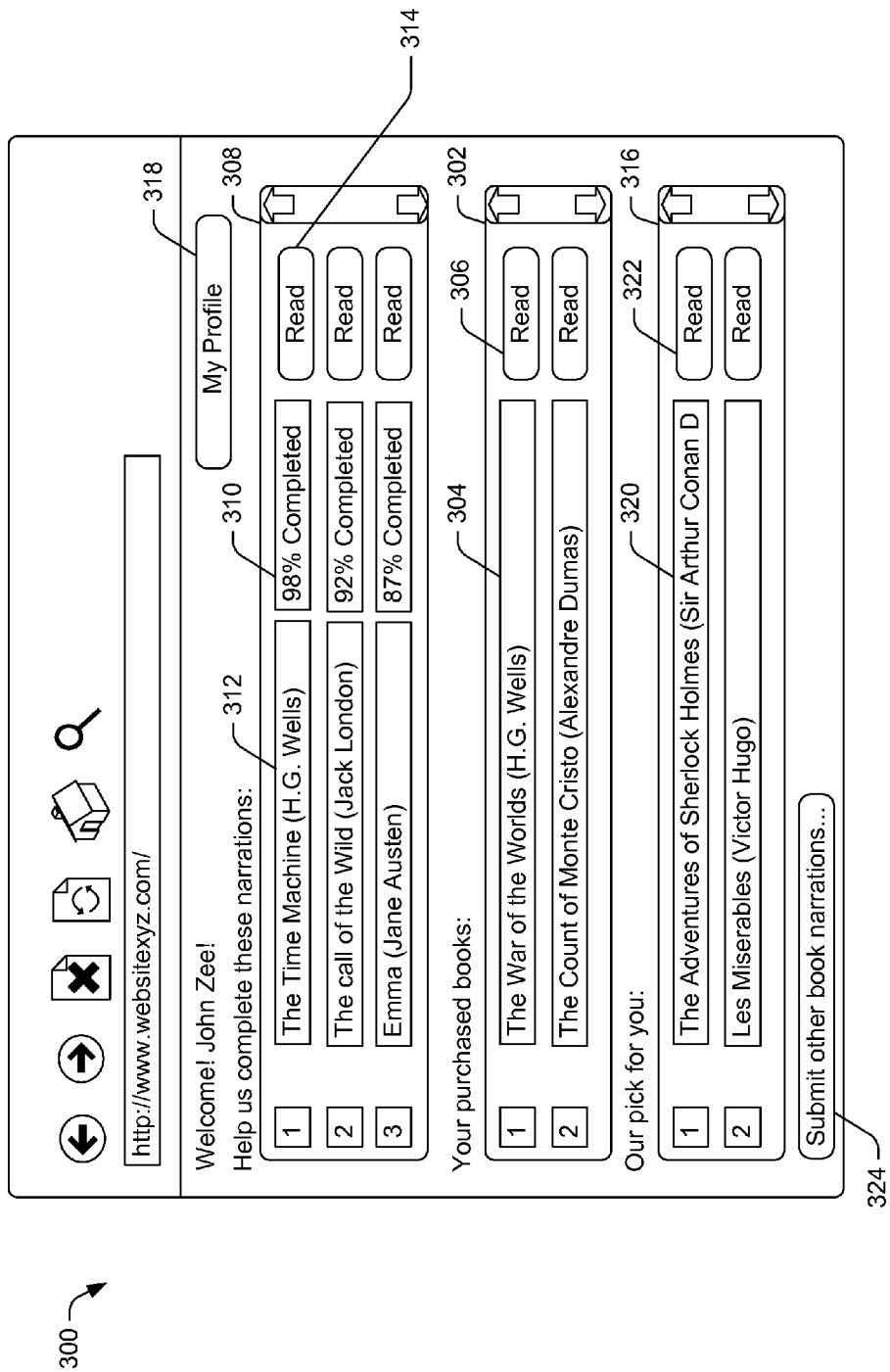
FIG. 3 shows an illustrative user interface page provided by the audio narration engine that enables a reader to select a text-based work for the purpose of contributing an audio reading.

FIG. 3 shows an illustrative user interface page 300 provided by the content presentation module 206 that enables a human reader to select a text-based work for the purpose of contributing an audio reading. The user interface page 300 may be a web page that is presented to the human reader via a web browser on a computing device, such as the computing device 104(1). In various embodiments, the content presentation module 206 may tailor the user interface page 300 for presentation to the human reader based on the identity and demographic information of the human reader.

The user interface page 300 may include a purchased text-based works section 302 that shows text-based works that have been purchased by the human reader from an entity that is operating the audio narration engine 108. For example, the entity may be an online merchant that provides text-based works for purchase and download. The purchased text-based work section 302 may be populated with the titles of the text-based works that are purchased by the human reader after the human reader authenticates to an authentication mechanism of the audio narration engine 108. The purchased text-based works section 302 may be populated in any order, such as chronologically according to viewing history or purchase history.

The human reader may select any of the text-based works that are listed in the purchased text-based works section 302 to read. For example, if the human reader desires to read the text-based work 304, which has the title "The War of the Worlds", the human reader may activate the corresponding selection button 306. Further, as described below, since the human reader has already purchased these text-based works, the human reader may provide audio readings for any portion of each text-based work as desired.

The user interface page 300 provided by the content presentation module 206 may further include a near completion section 308 that lists text-based works with almost completed audio readings. In some embodiments, the content presentation module 206 may use a completion threshold value (e.g., 80%) to select one or more text-based works from a library of text-based works that have corresponding audio readings for presentation in the near completion section 308. The text-based works in the near completion section 308 may be listed according to the percentage completion of their corresponding audio readings. For example, the text-based works may be listed from the highest percentage to the lowest, or vice versa. The content presentation module 206 may also list the audio reading completion percentage using a completion percentage indicator 310 for each text-based work in the near completion section 308. The audio reading completion percentages may serve to motivate the human reader to assist with completing a particular audio reading. For example, the human reader may see from the completion percentage indicator 310 that the audio reading for text-based work 312 with the title "The Time Machine" is 98% complete. As such, the human reader may be motivated to help complete the audio reading by selecting the text-based work 312 with the selection button 314.

In some embodiments, once the human reader has selected a text-based work from the near completion section 308, the content presentation module 206 may present sections of the text-based work that are to be read to complete the audio reading.

The user interface page 300 may further include a recommendation section 316 that provides recommended text-based works to be read by the human reader. The content presentation module 206 may select text-based works for presentation in the recommendation section 316 based on one or more factors. The factors may include the popularity of each text-based work. For example, the content presentation module 206 is more likely to list a text-based work available for purchase and/or download that is in high demand by users of the electronic devices 120(1)-120(N) in the recommendation section 316. In at least one embodiment, the demand may be assessed based on the number of times that the users of the electronic devices 120(1)-120(N) activates a computerized text-to-speech reading function on their respective electronic devices for each available text-based work. For example, if user demands of synthesized speech readings for a text-based work exceeds a predetermined number threshold or if the text-based work is one of a predetermined number of text-based works with the most demands for synthesized speech readings, then the content presentation module 206 may list the text-based work in the recommendation section 316.

The factors may further include the profile information of the human reader for which the user interface page 300 is tailored. For example, the human reader may have previously submitted profile information to the content presentation module 206 by using the profile option 318. The submitted profile information may include the gender of the human reader, the age of the human reader, the genre or types of text-based works preferred by the human reader, demographic or geographical location information related to the human reader (e.g., any notable accent of the human reader, countries or regions of residences, etc.). The profile information of the human reader may further include the voice characteristics of the human reader that are obtained from previous audio readings provided the human reader by the analysis module 210 or from a self-assessment. For example, the voice characteristics may include tone, pitch, resonance, vocal range, and/or the like.

The content presentation module 206 may use an assessment algorithm to analyze the one or more factors and generate a ranked list of matching text-based works to populate the recommendation section 316. The number of text-based works included in the ranked list may be based on a predetermined value. In various embodiments, the algorithm may use weighted factor scoring, machine learning techniques, and/or probabilistic model classifiers to find the most suitable text-based works based at least on the one or more factors. In some embodiments, the text-based works presented in the recommendation section 316 may be listed according to ranking scores assigned by the assessment algorithm (e.g., highest ranking score to the lowest ranking score). Thus, the text-based works listed in the recommendation section 316 may be both suited to be read by the human reader who is viewing the user interface page 300 and appealing to the users of the electronic devices 120(1)-120(N).

The human reader may select any of the text-based works that are listed in the recommendation section 316 to read. For example, if the human reader desires to read the text-based work 320, which has the title "The Adventure of Sherlock Holmes", the human reader may activate the corresponding selection button 322. Nevertheless, in some embodiments, there may be some restrictions as to the content sections of the text-based works selected from the recommendation section 316 that a human reader is able to read. In at least one embodiment, the content presentation module 206 may present sections of a text-based work that have not been previously read by other human readers to each human reader who selected the text-based work to read from a corresponding tailored recommendation section. In other words, the content presentation module 206 may distribute the text-based work in a manner that obtains that broadest human reading coverage for the text-based work.

Once the human reader has selected a text-based work to read using the user interface page 300, the selection may be passed to the content presentation module 206. In turn, the content presentation module 206 may present an illustrative user interface page, as shown in FIG. 4, which enables the human reader to contribute audio readings to the selected text-based work.

Nevertheless, in some embodiments, the user interface page 300 may further include a submission option 324 that enables the human reader to submit an audio file of an arbitrary reading of a text-based work. For example, when the human reader selects the submission option 324, the content presentation module 206 may open another user interface page that enable the human reader to navigate to a local directory on a computing device, such as the computing device 104(1), at which the audio recording to be submitted is stored. The user interface page may further include a fillable form that enables the human reader to provide identification information and section information regarding the text-based work corresponding to the audio recording.

Figure 4:
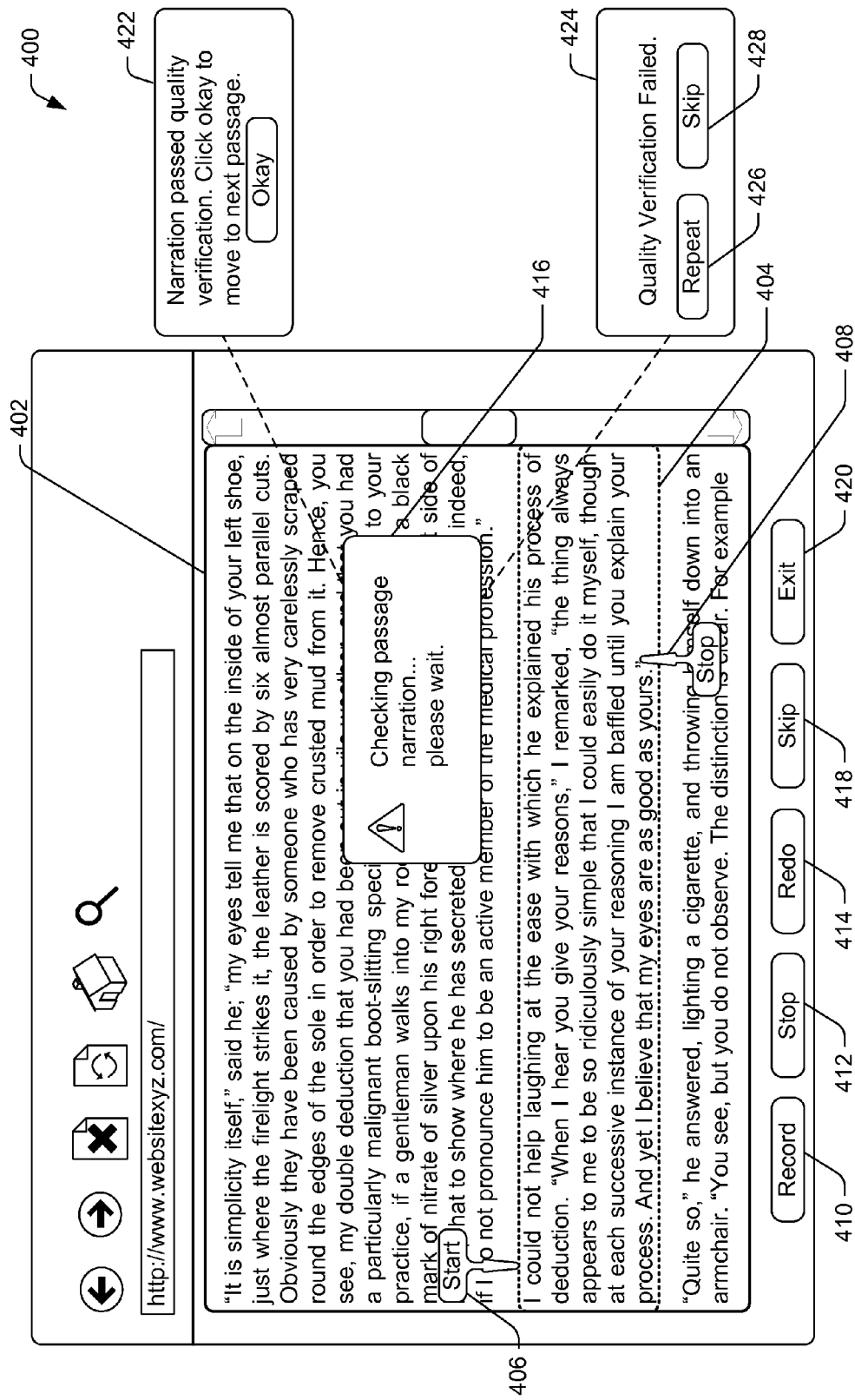
FIG. 4 shows an illustrative user interface page provided by the audio narration engine that enables a user to contribute audio recordings that correspond to sections of a selected text-based work.

FIG. 4 shows an illustrative user interface page 400 provided by the audio narration engine that enables the human reader to contribute audio recordings that correspond to sections of a selected text-based work. In some embodiments, the content presentation module 206 may present the user interface page 400 as a web page to the human reader via a web browser on a computing device, such as the computing device 104(1). The computing device 104(1) may include audio input and transmission components, such as a microphone and hardware and/or software that support voice over Internet Protocol (VoIP). Accordingly, the computing device 104(1) may transmit audio inputs from the human reader to the audio narration engine 108.

The user interface page 400 may display a portion 402 of a selected text-based work. The displayed portion 402 may further include a current section 404 that is to be read by the human reader. The content presentation module 206 may emphasize the current section 404 by displaying the text in the current section 404 in a different color, by highlighting the background of the current section 404 in a different color, and/or by enclosing the text of the current section 404 in a surrounding border. In some embodiments, the content presentation module 206 may further provide a start indicator 406 and a stop indicator 408 to mark the beginning and end of the current section 404. However, in some embodiments, rather than showing the content of the current section 404, the portion 402 may simply show a section reference (e.g., page number and paragraph number) to a printed work, with the expectation that the human reader is to find the appropriate content section that is equivalent to the current section 404 in the printed work for reading.

Accordingly, when the human reader is ready to submit an audio reading of the current section 404, the human reader may activate a record button 410 and then read the current section 404. The voice of the human reader may be transmitted to the audio collection module 208. Once the human reader has finished reading the current section 404, the human reader may activate a stop button 412. However, if for any reason the human reader determines during a recording or shortly after a recording to discard the audio recording and start over, the human reader may select the redo button 414.

However, if the human reader does not select the redo button 414, the audio collection module 208 may use the analysis module 210 to check the submitted audio recording. As such, the audio collection module 208 may cause a dialogue message 416 to appear on the user interface page 400. The dialogue message 416 may inform the human reader that verification is in progress. The user interface page 400 may further include a skip button 418 and an exit button 420. The human reader may use the skip button 418 to skip to a section of the text-based work if the human reader does not wish to read the current section 404. The human reader may use the exit button 420 to quit the user interface page 400.

The analysis module 210 may check each submitted audio recording based on several criteria. In at least one embodiment, the analysis module 210 may check to determine whether the background noise of an audio recording exceeds a maximum noise level. In some instances, the analysis module 210 may apply a noise reduction algorithm to reduce any background noise when the background noise of the submitted audio recording exceeds the maximum noise level. However, in the event that the noise reduction algorithm is unable to reduce the background noise to below the maximum noise level, the analysis module 210 may deem the submitted audio recording as unacceptable.

In other embodiments, the analysis module 210 may concurrently or alternatively use a speech-to-text converter to convert at least a portion of the submitted audio recording into text. With respect to the audio recording for the current section 404, the analysis module 210 may compare the text derived from at least a portion of the audio recording, i.e., spoken words, to written words in the original text in the current section 404. Thus, in an instance in which a match or association between the derived text to the original text is below a certain word match threshold (e.g., 90%), the analysis module 210 may deem the submitted audio recording as unacceptable. Otherwise, the submitted audio recording may be deemed as acceptable by the analysis module 210.

In various embodiments, the analysis module 210 may determine whether the text derived from at least a portion of the audio recording, i.e., spoken words, contains a minimal number of words. Thus, in an instance in which the derived text does not contain a word quantity threshold of words, then the analysis module 210 may deem the submitted audio recording as unacceptable. Otherwise, the submitted audio recording may be deemed as acceptable by the analysis module 210.

In some embodiments, the analysis module 210 may determine whether the derived text contains one or more inappropriate words added by a human reader that are not part of the original text. An inappropriate word may be a profanity, a vulgar word, an expletive, and/or any other word that is deemed unsuitable by an administrator of the audio narration engine 108 when added by the human reader and not included in the original text. Thus, when the analysis module 210 encounters an addition of an inappropriate word in the derived text, the analysis module 210 may deem the submitted audio recording as unacceptable. Otherwise, the submitted audio recording may be deemed as acceptable by the analysis module 210.

In other embodiments, the analysis module 210 may perform a combination of two or more of the above analysis of the derived text of an audio recording to determine an acceptability of the audio recording. For example, the analysis module 210 may deem the audio recording as unacceptable when the corresponding derived text of the audio recording fails to meet the word match threshold, the word quantity threshold, or is found to contain one or more added inappropriate words. For example, the analysis module 210 may deem the audio recording as acceptable when the corresponding derived text of the audio recording meets the word match threshold and the word quantity threshold, and does not include one or more added inappropriate words.

Accordingly, if the analysis module 210 determines that the submitted audio recording passes verification, the audio collection module 208 may save the submitted audio recording into the data store 218. As described above, the audio collection module 208 may label the saved audio recording with metadata. The metadata may include information regarding the identification of the text-based work, as well as the content section in the text-based work to which audio recording corresponds. The metadata may further include profile information on the human reader that submitted the audio recording. Thus, the metadata saved with the audio recordings may be useful in many aspects. In some instances, the content presentation module 206 may use the metadata to determine the audio reading supplementation status of different text-based works, and identify sections of various text-based works without corresponding audio readings for presentation to human readers. As further described below, in other instances, the integration module 212 may use the metadata to combine multiple audio recordings obtained for a text-based work into an integrated audio reading.

In some embodiments, once the submitted audio recording is saved, the audio collection module 208 may present a dialogue message 422 on the user interface page 400 that indicates the submitted audio recording passed quality verification. Subsequently, the audio collection module 208 may cause the content presentation module 206 to highlight the next section of the text-based work in the same manner as the current section 404, so that further readings of the text-based work may be submitted.

However, if the analysis module 210 determines that the submitted audio recording did not pass verification, the audio collection module 208 may discard the submitted audio recording. The audio collection module 208 may present a dialogue box 424 that indicates the submitted audio recording did not pass quality verification. The dialogue box 424 may include a repeat option 426 and a skip option 428. The human reader may select the repeat option 426 to repeat the reading of the current section 404 so that another audio recording for the content section may be submitted for verification. Conversely, the human reader may select the skip option 428 to skip directly to the next section. In such an instance, the content presentation module 206 may highlight the next section of the text-based work in the same manner as the current section 404, so that further readings of the text-based work may be submitted.

In other embodiments, the analysis module 210 may also analyze an arbitrary audio recording that is submitted via the submission option 324 of the user interface page 300. In instances in which a human reader has provided identification information and section information for the text-based work that corresponds to the audio recording, the analysis module 210 may convert the audio recording into text for comparison with the original text identified by the section information. Depending on the result of the comparison, the audio recording may be discarded or saved to the data store 218 as described above. However, in instances in which the human reader submitted an audio recording without identifying the corresponding text-based work or incorrectly identified the corresponding text-based work or text-based work section, the analysis module 210 may initially attempt to match the submitted audio recording to a content section of a text-based work from the collection of text-based works 122 using speech-to-text analysis, in which any matching results in the analysis module 210 assigning corresponding content section identifying metadata to the submitted audio recording. The analysis module 210 may then perform derived text to original text comparison for the submitted audio recording.

Returning to FIG. 2, the integration module 212 may combine multiple audio recordings that are submitted by one or more human readers into a continuous audio reading of a text-based work. In various embodiments, the integration module 212 may initially identify the audio recordings for the text-based work from multiple received audio recordings based on the metadata of each audio recording. Subsequently, the integration module 212 may use the metadata that accompanies each audio recording for the text-based work to splice at least some of the audio recordings together. For example, the metadata for a first audio recording may indicate that the first audio recording corresponds to a first chapter in a text-based work that is a book. Likewise, the metadata for a second audio recording may indicate that the second audio recording corresponds to a second chapter in the book. Accordingly, the integration module 212 may digitally append the second audio recording after the first audio recording to form an integrated audio recording. The integration module 212 may continuously perform such digital splicing for all the audio recordings that belong to a text-based work as additional audio recordings are received.

In instances in which multiple audio recordings from multiple human readers are available for a particular content section of a text-based work, the integration module 212 may select an audio recording from the multiple audio recordings for integration into a final integrated audio recording. The selection may be based on one or more attributes. One of the attributes may be the subjective rating of each audio recording by users of the electronic devices 120(1)-120(N). As further described below, a plurality of users may be given the opportunity to provide an overall impression rating on a standardized rating scale (e.g., 4 out of 5 stars) for each audio recording or groups of audio recordings. The integration module 212 may use such ratings to select the audio recording from the multiple audio recordings.

The attributes may also include the continuity value of each audio recording in relation to other audio recordings. Each continuity value may measure the harmony of the corresponding audio recording with respect to other audio recordings. For example, when the majority of audio recordings for sections of a text-based work feature male voices, the integration module 212 may assign a higher continuity value to an audio recording for a section that also features a male voice than to an audio recording for the same section that features a female voice. Thus, the integration module 212 may also assess the continuity value of each audio recording based on one or more speech qualities, such as gender characteristic, tone, pitching, resonance, vocal range, and/or the like.

Accordingly, the integration module 212 may use an analysis algorithm to select a most suitable audio recording from the multiple audio recordings for the same section. In various embodiments, the algorithm may use weighted factor scoring, machine learning techniques, and/or probabilistic model classifiers to assess the one or more attributes and select the most suitable recording. For example, in some instances, an audio recording that has a lower rating may nevertheless be selected over an audio recording with a higher rating because the audio recording with the lower rating increases the overall continuity of the final integrated audio reading.

In other instances, multiple audio recordings may contain overlapping readings of the same section of a text-based work. In such instances, the integration module 212 may analyze the overlapping portions of the audio recordings as described above. Accordingly, depending on which of the overlapping portions is found most suitable based on one or more attributes of the corresponding audio works, the integration module 212 may discard one overlapping portion that is found to be less suitable and retain the other overlapping portion that is found to be more suitable. Following the elimination of one of the overlapping portions, the integration module 212 may digitally splice the multiple audio recordings together.

The distribution module 214 may combine an audio reading that is produced for a text-based work with the text-based work based on the title and content section metadata embedded with the audio reading. In other words, the distribution module 214 may synchronize the audio reading with the textual content in the underlying text-based work. In this way, when a user activates an audio reading feature for a particular section of textual content, the appropriate audio reading corresponding to the particular section is played back. The audio reading produced for a text-based work may correspond to at least a portion of or the entire textual content of the text-based work. The combination of an audio reading and the corresponding text-based work may produce an enhanced version of the text-based work.

In some embodiments, the distribution module 214 may continuously provide audio reading updates to text-based works that are stored on the electronic devices 120(1)-120(N). The updating of a text-based work with corresponding audio readings may be performed as soon as each audio reading becomes available, on a periodic basis (e.g., hourly, daily, weekly, etc.), and/or when the user of an electronic device requests an update to the text-based work. Additionally, the distribution module 214 may also deliver enhanced versions of text-based works to electronic devices 120(1)-120(N) that newly request downloads of the text-based works.

The registration module 216 may provide a user interface page that enables the human readers at the computing devices 104(1)-104(N) to sign up for a collaborative reading of a text-based work online. The functions performed by the registration module 216 may be described with respect to FIG. 5.

Figure 5:
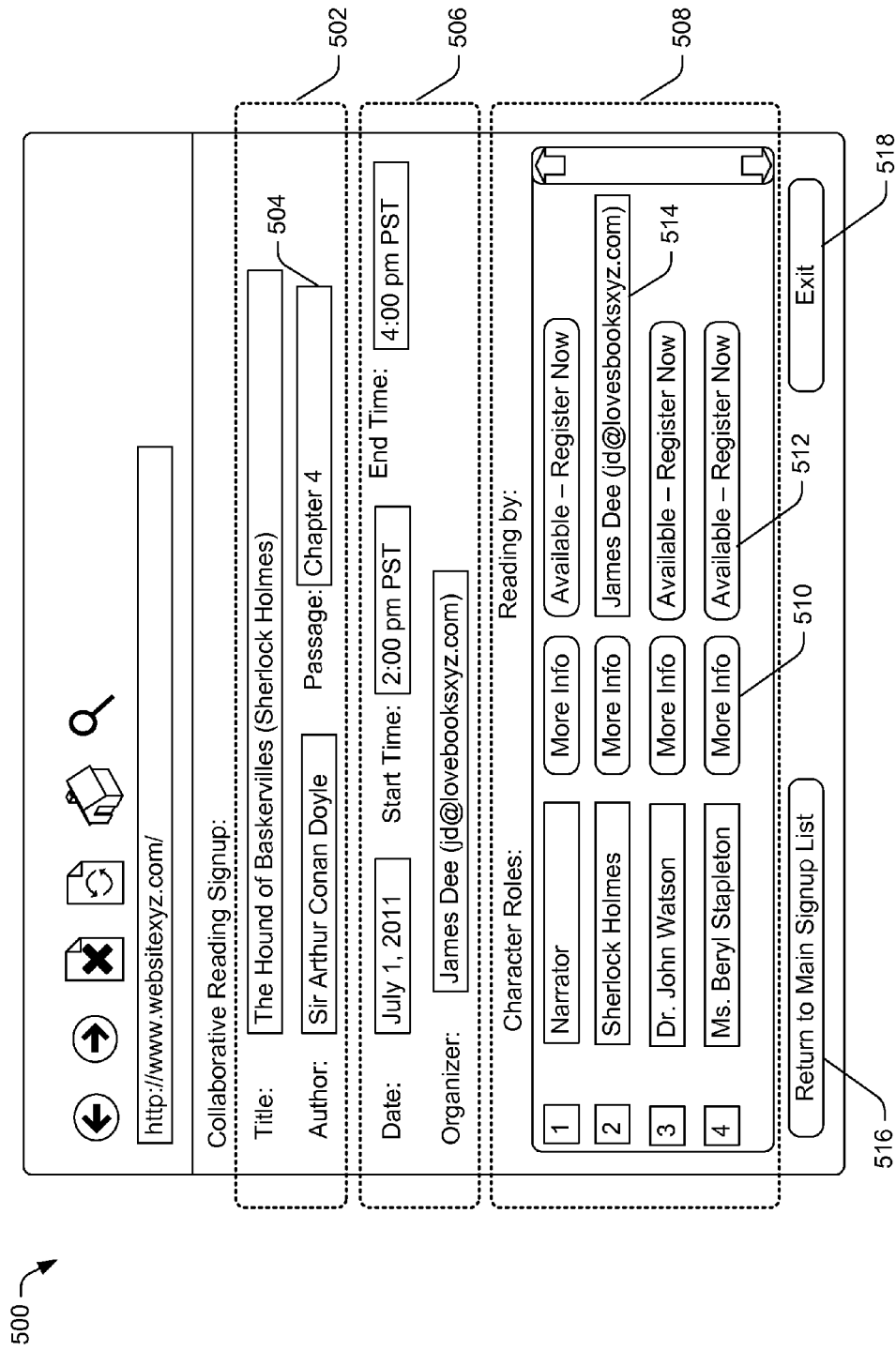
FIG. 5 shows an illustrative user interface page provided by the audio narration engine that enables users to register for a collaborative reading of a text-based work.

FIG. 5 shows an illustrative user interface page 500 provided by the registration module 216 of the audio narration engine 108 that enables human readers to register for a collaborative reading of a text-based work. A human reader may navigate to the user interface page 500 by browsing through a collection of text-based works on a main sign up page. The registration module 216 may display the user interface page 500 as a web page on one or more of the computing devices 104(1)-104(N).

The user interface page 500 may include a text-based work information portion 502 that lists information regarding the text-based work, including section information 504 that indicates the specific section of the text-based work that is to be read. The user interface page 500 may also include an event section 506 that lists the date and time at which the collaborative reading may occur. The event section 506 may also include other data about the event, including the name and contact information for the organizer.

Additionally, the user interface page 500 may include a sign up section 508 that lists the different character roles that are available for reading. Each of the character roles may be provided with an information button and a registration button. The selection of an information button for a character role, such as the information button 510, may cause the registration module 216 to bring up an additional user interface page that provides background information regarding the character role, including any recommended reader characteristics that are desirable for the character role. The reader characteristics may include a gender of the reader, speech qualities of the reader, and/or the like.

The selection of a registration button, such as the registration button 512, may enable a human reader to commit to read the character role. The registration may involve the human reader providing personal and/or contact information using an additional user interface page that is instantiated by the selection of a registration button. Further, once a character role has been taken by a human reader, the registration module 216 may change the corresponding registration button to a name display, such as the name display 514, which shows the name of the reader registered for the character role. In some embodiments, the name display may be a clickable link that leads to a profile page for the reader. The profile page may display additional information regarding the reader, including demographic information, contact information, rating of the reader on a standardized scale, other user reviews or comments about the human reader, and/or the like.

The user interface page 500 may further include a main list button 516 that enables a human reader to navigate to the main sign up page, and an exit button 518 that enables the human reader to close the user interface page 500.

In various embodiments, the organizer of the collaborative reading may have the ability to determine whether the collaborative reading is to proceed based on the number of character roles that have been taken by readers. Thus, if the organizer determines that a sufficient number of character roles are taken, the organizer may indicate to the registration module 216 that the collaborative reading is to proceed. In response, the registration module 216 may send a confirmation (e.g., email confirmation) to each registered reader who signed up for the collaborative reading. The confirmation may include information (e.g., a web link) for accessing a collaborative user interface page that presents content sections of the text-based work for collaborative reading. Otherwise, the registration module 216 may send an email to each registered reader indicating that the collaborative reading is cancelled. In other embodiments, the registration module 216 may automatically determine whether to proceed with the collaborative reading based on whether a percentage of the characteristic roles with human reader registrations has met a predetermined threshold (e.g., 90%), and/or whether one or more key character roles have been registered for by human readers.

The collaborative user interface page for facilitating collaborative reading of a text-based work by multiple readers may function in a similar manner as the user interface page 400 described in FIG. 4. However, the collaborative user interface page may be viewed simultaneously by the multiple readers. Further, the collaborative user interface page may also include an indicator portion that at numerous times indicates a current reader from the multiple registered readers that is supposed to read each highlighted section of content of the text-based work. However, in other embodiments, the collaborative user interface page may enable each human reader to take turns to read his or her sections of content all at once.

Return to FIG. 2, the data store 218 may store the text-based works 112 and the metadata-embedded audio recordings, such as the audio recordings 114(1)-114(N), that are obtained and processed by audio narration engine 108. The data store 218 may also store the integrated products that are combinations of text-based works and associated audio files. The data storage module 142 may further store various data generated and used by the modules 206-216 of the audio narration engine 108.

Example Electronic Device Modules

Figure 6:
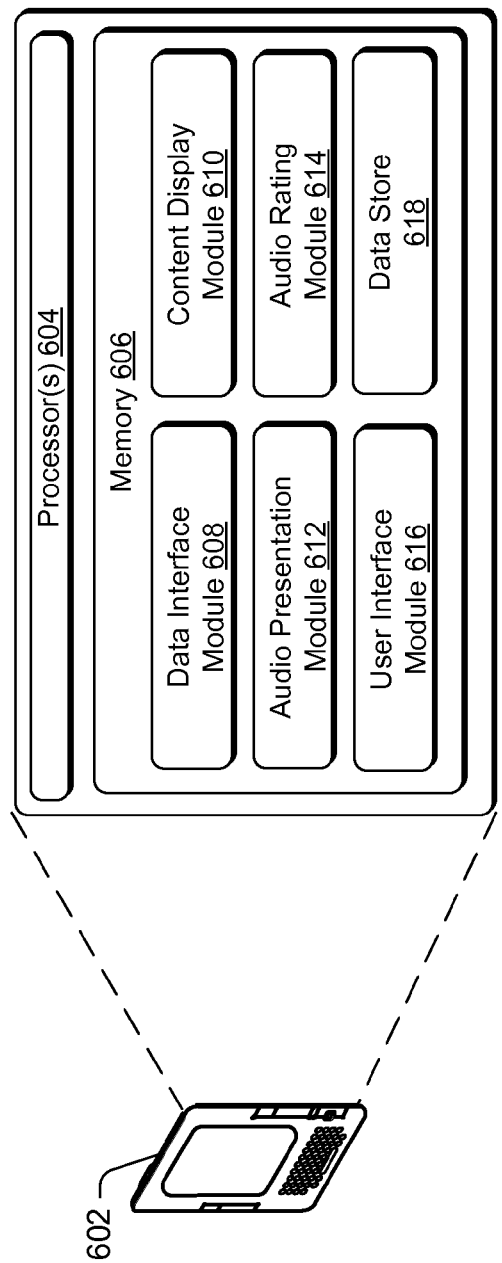
FIG. 6 is a schematic diagram of illustrative components in an example electronic device that is used to consume audio narrations of text-based works.

FIG. 6 is a schematic diagram of illustrative components in an example electronic device 602 that is used to consume audio narrations of text-based works. The example electronic device may be one of the electronic devices 120(1)-120(N) that is used to read the text-based works 112 or enhanced text-based works, such the enhanced text-based work 118.

The electronic device 602 may include processor(s) 604 and memory 606. The memory 606 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

The electronic device 602 may include a data interface module 608, a content display module 610, an audio presentation module 612, an audio rating module 614, and a user interface module 616. The modules may include routines, programs, instructions, objects, and/or data structures that perform particular tasks or implement particular abstract data types. The electronic device 602 may also implement a data store 618.

The data interface module 608 may enable the user to request and download text-based works 112 or enhanced text-based works from the server(s) 102. The data interface module 608 may download the text-based works via any wireless or wired communication interfaces, such as Universal Serial Bus (USB), Ethernet, Bluetooth®, Wi-Fi, and/or the like.

The content display module 610 may present each of the text-based works on a display of the electronic device 602 for viewing. In various embodiments, the content display module 610 may provide functionalities that enable the user to manipulate a text-based work, such as browsing back and forth among the electronic pages of the text-based work, skipping to different sections of the text-based work, conducting searches for particular words or phrases in the text-based work, and/or so forth.

The audio presentation module 612 may present audio readings of the text-based works. In some instances, the audio presentation module 612 may use a text-to-speech algorithm to generate audio readings of the text-based works. In other instances, the audio presentation module 612 may play the audio files recorded by human readers, such as the audio file 116, that are associated with some text-based works.

The audio rating module 614 may enable a user of the electronic device 602 to rate the different audio recordings that may be available for each section of a text-based work on a standardized scale. In various embodiments, the ratings provided by the users via their electronic devices 120(1)-120(N) may be transmitted back to the integration module 212. In turn, the integration module 212 may use the ratings to assess or reassess which audio recording to select for integration into a combined audio reading. The operations performed by the modules 608-612 of the electronic device 602 may be further described with respect to FIG. 7.

Figure 7:
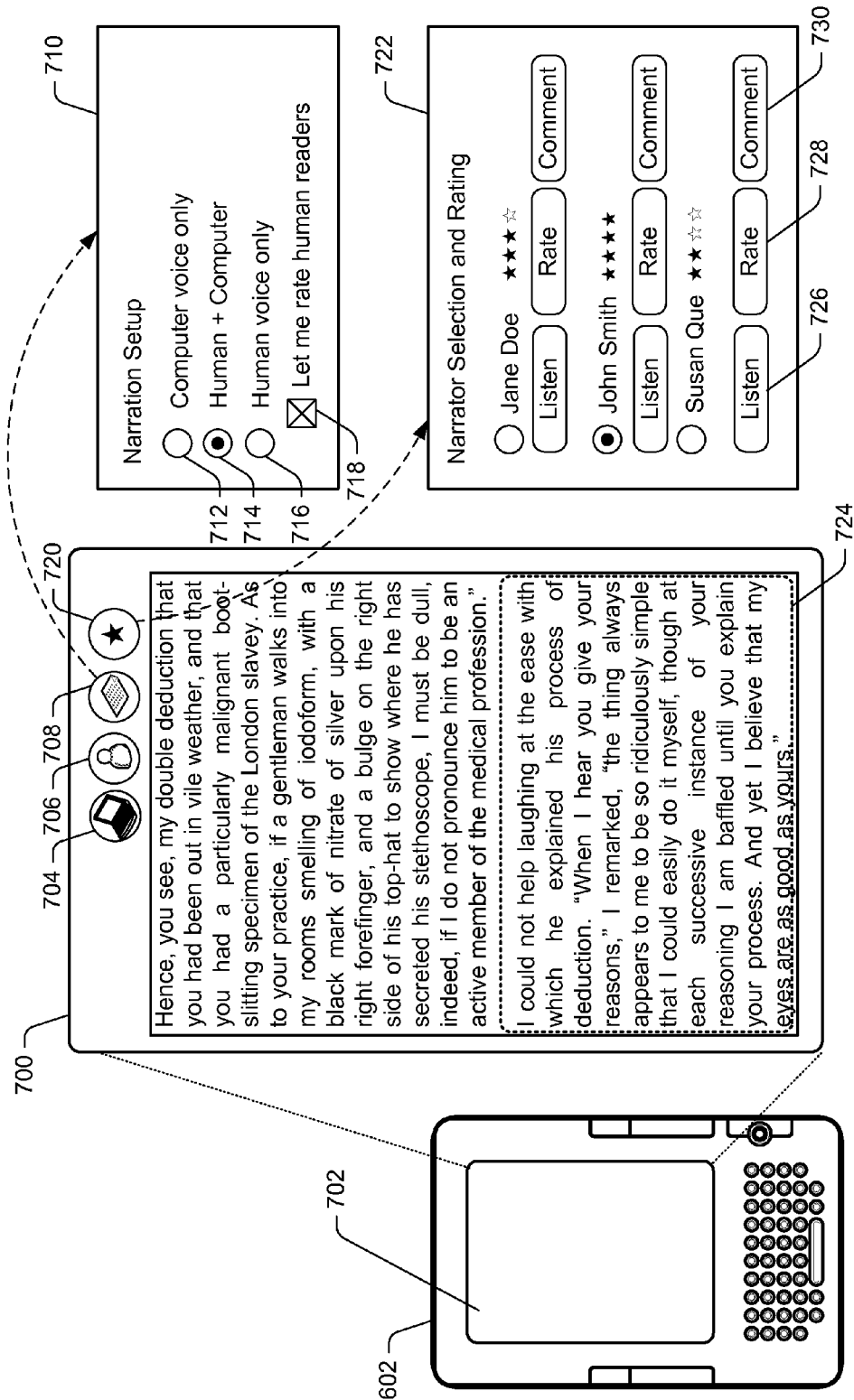
FIG. 7 shows an illustrative user interface screen displayed on an electronic device that enables users to consume text-based works and rate audio readings of the text-based works.

FIG. 7 shows an illustrative user interface screen 700 displayed on an electronic device that enables users to consume text-based works and rate audio readings of the text-based works. The user interface screen 700 may be displayed on a display 702 of the electronic device 602.

As shown, the content display module 610 may present portions of a text-based work in the user interface screen 700. Accordingly, the user may use the user interface screen 700 on the electronic device 602 to cause the content display module 610 to present different portions, e.g., pages, sections, chapters, etc. of the text-based work.

The audio presentation module 612 may present a synthesized speech icon 704 and a human speech icon 706 on the user interface screen 700. The synthesized speech icon 704 may be selected by the user to activate the computerized reading of the content portion that is displayed on the user interface screen 700. The audio presentation module 612 may use a text-to-speech algorithm to generate the reading of the content portion. The human speech icon 706 may be displayed when human audio reading of the content portion is available. In instances in which human audio reading of the content portion displayed on the user interface screen 700 is not available, the audio presentation module 612 may gray out the human speech icon 706 or render the icon invisible. Thus, in some instances, the user may not only use the human speech icon 706 to activate the playback of audio reading of the content portion, but also determine whether human audio reading of the content portion is available.

The audio presentation module 612 may additionally present an audio setup icon 708. The selection of the audio setup icon 708 may cause the electronic device 602 to display an audio configuration page 710. In various embodiments, the audio configuration page 710 may include a set of controls, such as radio buttons or other selectors. A first option 712 may enable the user to designate which readings are to be performed using the computerized speech. A second option 714 may enable the user to designate having readings performed in both human and computer voice. In this mode, the audio presentation module 612 may use the audio recordings of human readings whenever possible, and fill in any gaps in the audio recordings with a computerized voice. A third option 716, on the other hand, may enable the user to select having readings performed only in human voice using audio recordings, without any gap filling by the computerized voice. In some embodiments, the audio configuration page 710 may further include a checkbox 718 that enables the user to select whether the user wants to rate the audio readings performed by human readers.

Accordingly, in some instances, the checking of the checkbox 718 may cause the data interface module 608 to append additional audio readings to a downloaded audio file. The additional audio readings may include audio readings that correspond to identical content sections. In this way, the user may provide rating feedback to the audio narration engine 108 as to which audio reading is the best for a particular content section. The checking of the checkbox 718 may also cause the content display module 610 to display a rating icon 720 to the user interface screen 700. The rating icon 720 may enable the user to rate the audio readings of each content section in the text-based work by human readers. In various embodiments, when the user desires to rate the human reading of a particular section, the user may initially select (e.g., tap, circle, highlight, etc.) the content section displayed in the user interface screen 700 and then select the rating icon 720.

The selection of the rating icon 720 may cause the audio rating module 614 to display a rating menu for the selected content section, such as a rating menu 722. The selection of the rating icon 720 may also cause the audio rating module 614 to emphasize the content section of the text-based work that is being rated, such as a section 724. The emphasis may include displaying the text in the content section in a different color, highlighting the background of the content section in a different color, and/or by enclosing the text of the content section in a surrounding border.

The rating menu 722 may display the name of the reader that contributed the audio reading for the selected content section, as well as provide a scaled rating control (e.g., star rating display) that shows the current rating for the audio reading of the content section by the reader. In at least one embodiment, the scaled rating control may be adjusted, so that the user may manipulate the scaled rating (e.g., less stars or more stars) to input the user's rating for the audio reading of the content section. The rating menu 722 may also display a listen option, a rate option, and a comment option for each human reader. Each listen option may be activated by the user to playback the audio reading contributed by the corresponding human reader. Each rate option may be activated by the user to submit the corresponding user rating to the integration module 212 on the audio narration engine 108. Each comment option may be activated by the user to instantiate a comment page, in which the comment page may enable the user to leave a comment regarding the audio reading of the content section by the reader. For example, the rating menu 722 may display a listen option 726, a rate option 728, and a comment section 730 that corresponds to the reader name "Susan Que."

Further, as shown in FIG. 7, in instance in which multiple audio recordings from multiple human readers are available for the section 724 of the text-based work, the rating menu 722 may display a scaled rating control, a listen option, a rate option, and a comment option for each of the multiple human readers. The options in the rating menu 722 may be selected via a corresponding control, such as a radio button or other type of selector. In this way, the user may listen to and compare the different audio recordings for the section 724, and provide a rating for each audio recording to the integration module 212 of the audio narration engine 108. In turn, as described above, the integration module 212 may use the ratings as one of the attributes for determining which of the multiple audio recordings is to be integrated into a final audio reading of the text-based work. Thus, depending on the user ratings of the audio readings, the integration module 212 may develop a new audio reading for a text-based work, or modify an existing audio reading for a text-based work to improve the user appeal of the text-based work. It will be appreciated that while the rating menu 722 is described as being presented in the context of the user interface screen 700, the rating menu 722 may be further included in a web page interface that is configured to enable users to rate audio recordings for text-based works in other embodiments.

Returning to FIG. 6, the user interface module 616 may receive input from various user controls of an electronic device 602. As described above, the user controls may include, but are not limited to, combinations of one or more of keypads, keyboards, mouse devices, touch screens, microphones, speech recognition packages, and any other suitable devices or other electronic/software selection methods. Further, the user interface module 616 may also provide data to the user via the display of the electronic device 602.

Accordingly, the user interface module 616, in conjunction with user controls on the electronic device 602, may enable a user to select content portions of various text-based works for viewing, as well as access and dismiss the various menus used to establish configuration settings, activate audio readings of the content portions, and/or rate the audio readings of the content portions.

The data store 618 may store the various text-based works that are downloaded from the server(s) 102 for viewing on the electronic device 602. Moreover, the data store 618 may also store any additional data that facilitates text-based work viewing, audio presentation and/or audio reading ratings. Such data may include configuration settings, different versions of the text-based works, and/or so forth.

Illustrative Operations

Figure 8:
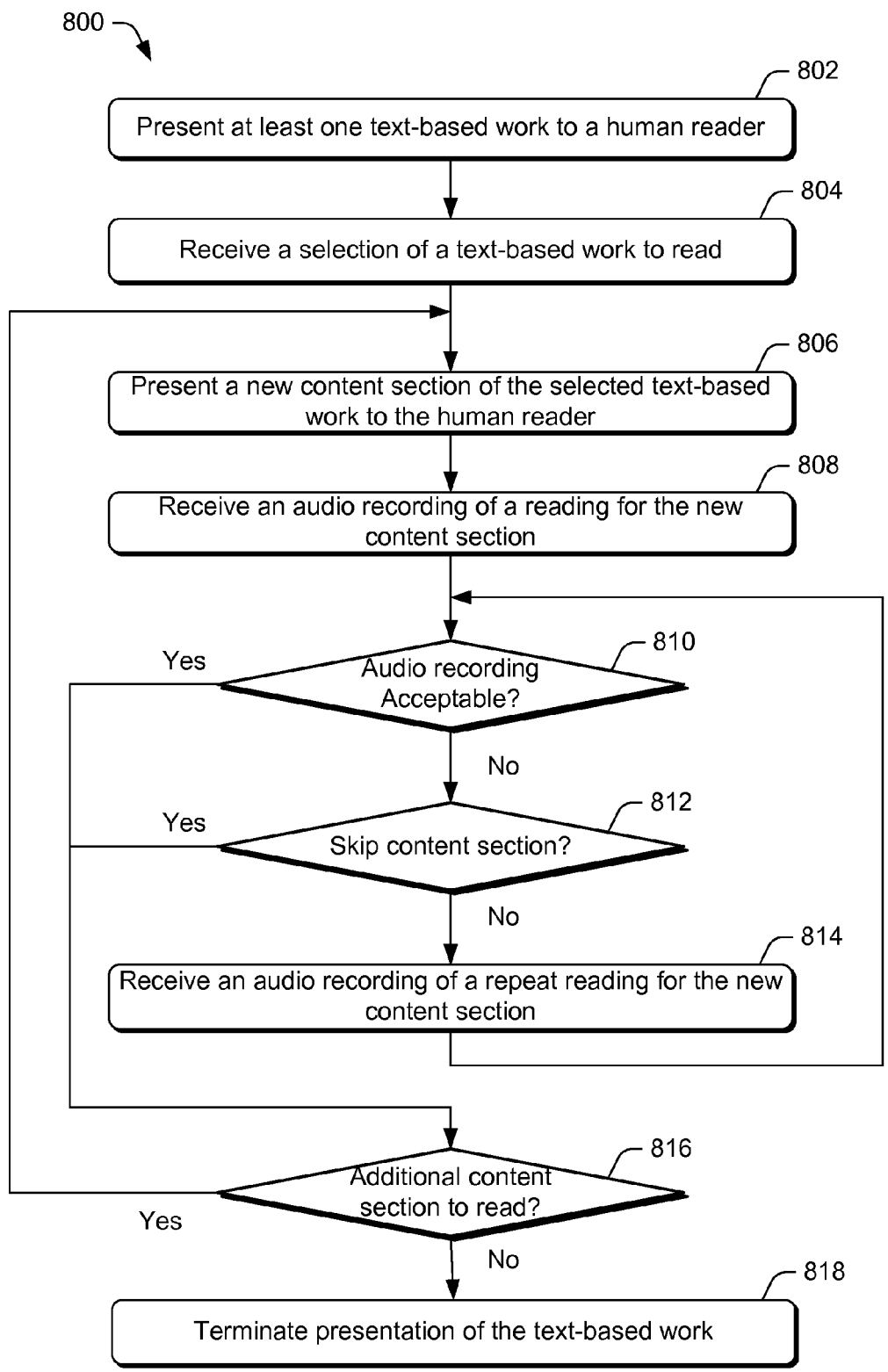
FIG. 8 is a flow diagram of an illustrative process for obtaining a collection of audio readings of multiple sections of a text-based work.
Figure 9:
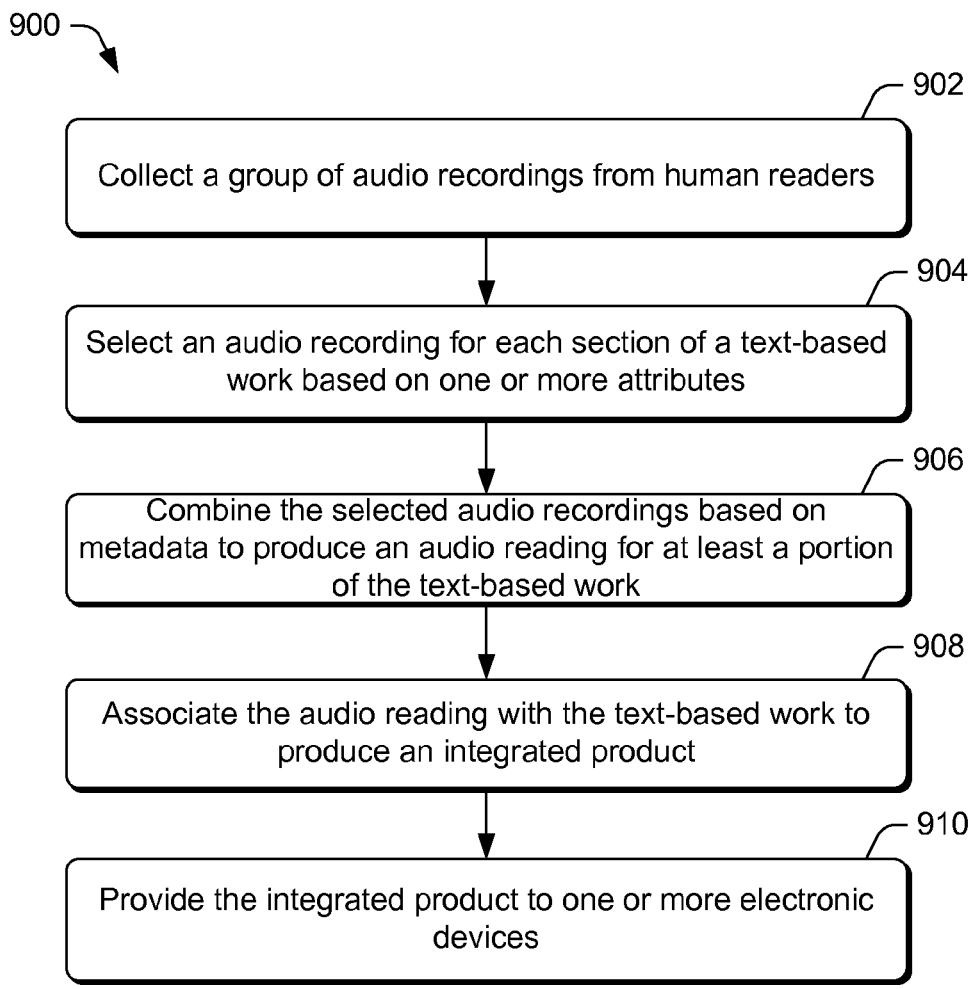
FIG. 9 is a flow diagram of an illustrative process for integrating audio recordings produced for a text-based work into an audio reading of the text-based work and distributing the audio reading with the text-based work.
Figure 10:
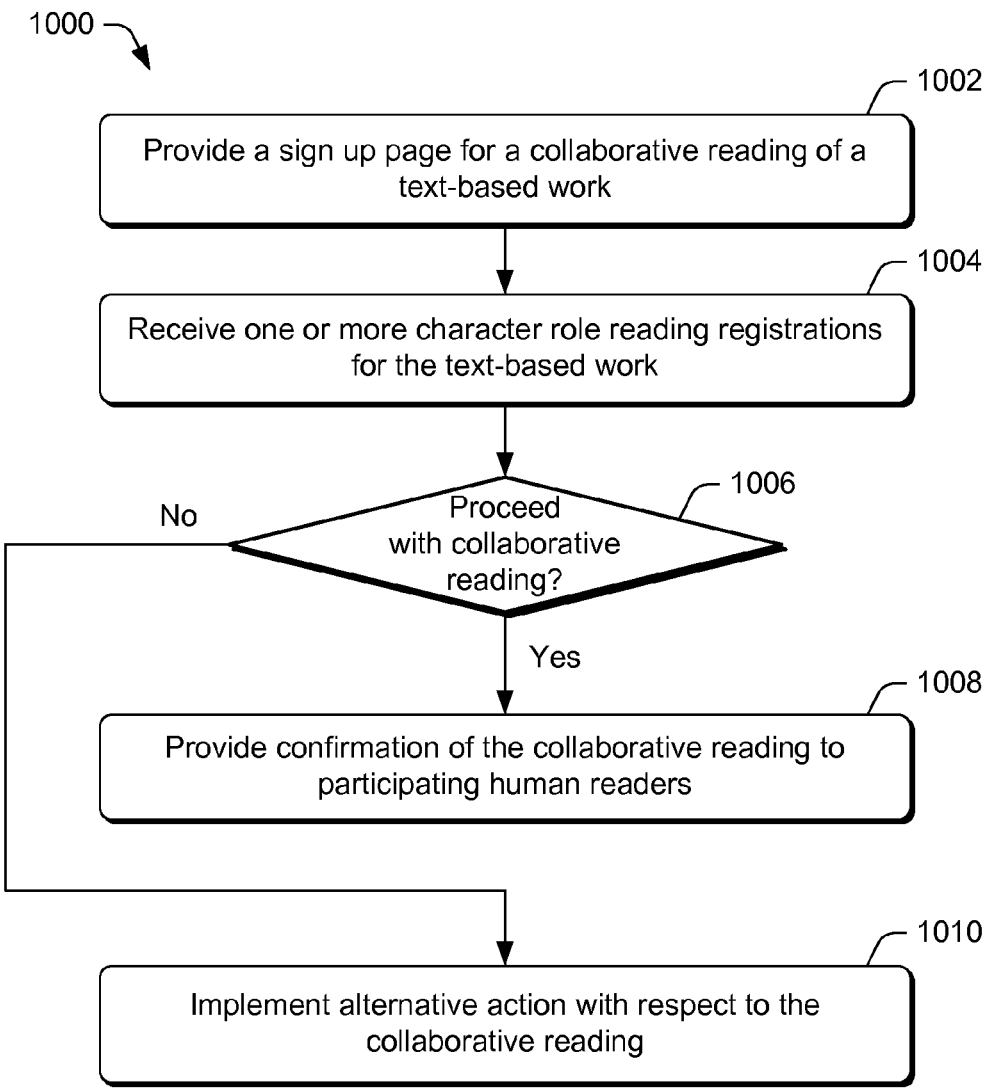
FIG. 10 is a flow diagram of an illustrative process for facilitating a collaborative reading of a text-based work by multiple participants.

FIGS. 8-10 show illustrative processes 800-1000 that facilitate the generation of audio narrations by a community of human readers. Each of the processes 800-1000 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 800-1000 are described with reference to the environment 100 of FIG. 1.

FIG. 8 is a flow diagram of an illustrative process 800 for obtaining a collection of audio readings of multiple sections of a text-based work. At block 802, the content presentation module 206 of the audio narration engine 108 may present at least one text-based work to a human reader. The audio narration engine 108 may be implemented by the server(s) 102. The at least one text-based work may include a text-based work that is purchased by the human reader and/or a text-based work having an audio reading that is near completion. Alternatively or concurrently, the at least one text-based work may also include a text-based work that is selected for presentation to the human reader based on a profile of the human reader and/or a demand for the text-based work. Each text-based work may include one or more content sections that are identified as without corresponding audio readings.

At block 804, the content presentation module 206 may identify a selection of a text-based work to be read by the human reader. In various embodiments, the content presentation module 206 may present text-based works and receive the selection of a text-based work for reading via a web interface that is presented to the user via an electronic device.

At block 806, the content presentation module 206 may present a new section of the text-based work to the human reader. The presentation of the new section may be performed via the web interface. The new section may be presented in the context of the overall text-based work via emphasis or highlighting of the new section. The new section may be a section selected by the human reader or the content presentation module 206 for reading.

At block 808, the audio collection module 208 of the audio narration engine 108 may receive an audio recording of a reading for the new content section. In various embodiments, the audio collection module 208 may receive the audio recording as an audio file that is transmitted from the electronic device to the audio narration engine 108.

At decision block 810, the audio collection module 208 may determine whether the audio recording is acceptable. In various embodiments, the determination may be made by the audio collection module 208 based on factors such as background noise, clarity, and/or whether the reading in the audio recording actually comports with text in the corresponding text-based work section.

Thus, if the audio collection module 208 determines that the audio recording is not acceptable ("no" at decision block 810), the process 800 may further proceed to decision block 812. At decision block 812, the audio collection module 208 may determine whether a skip content section request is received from the user. In various embodiments, the audio collection module 208 may present the human reader with the choice of skipping the reading of the content section or repeating the reading of the content section.

Thus, if the audio collection module 208 determines that the human reader does not request to skip the reading of the content section ("no" at decision block 812), the process 800 may proceed to block 814. At block 814, the audio collection module 208 may receive an audio recording of a repeat reading for the new content section. Subsequently, the process 800 may loop back to block 808, so that the new audio recording may be evaluated for acceptability by the audio collection module 208.

Returning to decision block 810, if the audio collection module 208 determines that the audio recording is acceptable ("yes" at decision block 810), the process 800 may proceed directly to decision block 816. At decision block 816, the content presentation module 206 may determine whether there are additional content sections for the human reader to read. In various embodiments, the determination may be made based on whether the end of the text-based work is reached or whether the human reader indicated a desire to stop providing human readings of the additional content sections. Thus, if the content presentation module 206 determines that there are no additional content sections to read ("no" at decision block 816), the process 800 may proceed to block 818. At block 818, the content presentation module 206 may terminate the presentation of the text-based work.

However, if the content presentation module 206 determines that there are additional content sections to read ("yes" at decision block 816), the process 800 may loop back to block 806, so that another new content section of the selected text-based work may be presented to the human reader.

Returning to decision block 812, if the audio collection module 208 determines that the human reader has requested the content section to be skipped ("yes" at decision block 812), the process 800 may proceed to decision block 816, so that the content presentation module 206 may determine whether there are additional content sections for the human reader to read.

FIG. 9 is a flow diagram of an illustrative process 900 for integrating audio recordings produced for a text-based work into an audio reading of the text-based work and distributing the audio reading with the text-based work. At block 902, the audio collection module 208 may collect a group of audio recordings. The audio recordings may contain human readings of content sections in various text-based works. The audio collection module 208 may collect the audio recordings from one or more human readers.

At block 904, the integration module 212 may select an audio recording for each content section in a particular text-based work. The integration module 212 may initially identify the audio recordings for the text-based work from multiple received audio recordings based on the metadata associated with each audio recording. The integration module 212 may then perform audio recording selection using the metadata of each audio recording. The metadata may include information regarding the identification of the text-based work, as well as the content section in the text-based work to which audio recording corresponds. The metadata may further include profile information on the human reader that submitted the audio recording.

In instances in which one audio recording is available for a section of the text-based work, the audio collection module 208 may select the one audio recording. However, in instances in which multiple audio recordings are available for a section of the text-based work, one of the multiple audio recordings may be selected based on one or more attributes. The attributes may include the continuity value of each audio recording in relation to other audio recordings, and/or the rating assigned by the users to each audio recording. In some embodiments, an overlapping section from the overlap sections of audio recordings may be selected in a similar manner as multiple audio recordings for a section of the text-based work, with the non-selected overlapping section being discarded.

At block 906, the integration module 212 may combine one or more of the selected audio recordings based on their respective metadata to produce an audio reading or group of audio readings for at least a portion of the text-based work.

At block 908, the integration module 212 may associate the audio reading with the text-based work. In some embodiments, the integration may include producing a new integrated product based on the text-based work and the obtained audio reading. In other embodiments, the integration may include updating a previously downloaded text-based work with the newly obtained audio reading.

At block 910, the distribution module 214 may provide the integrated product to one or more electronic devices, such as the electronic devices 120(1)-120(N), for use by one or more corresponding users. In alternative embodiments, the distribution module 214 may distribute the audio reading separately from the text-based work to the one or more electronic devices.

FIG. 10 is a flow diagram of an illustrative process 1000 for facilitating a collaborative reading of a text-based work by multiple participants. At block 1002, the registration module 216 of the audio narration engine 108 may provide a sign up page for a collaborative reading of a text-based work. The sign up page may include information on the text-based work that is the focus of the collaborative reading, with information on the specific sections of the text-based work to be read. The sign up page may further include the date and time of the collaborative reading, as well as a registration interface that enables human readers to select character roles to read.

At block 1004, the registration module 216 may receive one or more character role reading registrations for the text-based work. In various embodiments, a human reader may provide personal and/or contact information to complete a corresponding character role registration.

At decision block 1006, the registration module 216 may determine whether to proceed with the collaborative reading that is received. In various embodiments, the request to proceed may be provided by an organizer of the collaborative reading. The organizer may make a determination as to whether to proceed based on the number of character roles for which human readers have signed up. In other embodiments, the registration module 216 may automatically determine whether to proceed with the collaborative reading based on whether a percentage of the characteristic roles with human reader registrations has met a predetermined threshold (e.g., 90%), and/or whether one or more key character roles have been registered for by human readers. Accordingly, if the registration module 216 determines that the collaborative reading is to move forward ("yes" at decision block 1006), the process 1000 may proceed to block 1008. At block 1008, the registration module 216 may provide confirmation of the collaborative reading to the participating human readers. The confirmation may include information (e.g., web link) for accessing a collaborative user interface page that presents content sections of the text-based work for collaborative reading.

However, if the registration module 216 determines that the collaborative reading is not to move forward ("no" at decision block 1006), the process 1000 may proceed to block 1010. At block 1010, the registration module may implement alternative actions with respect to the collaborative reading. In various embodiments, the registration module 216 may receive instructions from the organizer to reschedule the collaborative reading. For example, the registration module 216 may cancel the currently scheduled collaborative reading and post a new sign up page with an alternative date and time for the collaborative reading. In other embodiments, the registration module 216 may implement a cancellation of the collaborative reading without rescheduling.

In summary, the community-based generation of audio narrations for text-based work leverages collaboration of a community of people to provide human-voiced audio readings. In this way, human-voiced audio readings of text-based works may be produced without the reliance on the use of professional human book readers or narrators. Further, self-publishing content providers may be able to produce audio versions of their text-based works at little or no cost. Additionally, user consumption experiences of text-based works on electronic devices may be improved, as users may no longer rely on text-to-speech technology built into the electronic devices that may produce unnatural sounding audio readings of text-based works.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computer readable media storing computer-executable instructions that, when executed, cause one or more processors to perform acts comprising:
   selecting a text-based work that includes at least one content section without a corresponding audio reading;
   presenting the text-based work to a plurality of human readers to solicit an audio reading of the at least one content section of the text-based work;
   obtaining a group of audio recordings from the plurality of human readers, each audio recording having metadata that identifies a respective location within a corresponding content section of the text-based work;
   combining the group of audio recordings in order using the respective location identified by the metadata of the audio recordings to produce an audio file that includes the audio reading for at least the content section of the text-based work; and
   distributing an integrated product that includes a copy of the text-based work and a copy of the audio file to an electronic device.

2. The one or more computer readable media of claim 1, wherein the obtaining includes storing an audio recording made by a human user when a threshold number of spoken words in the audio recording match text in a corresponding content section of the text-based work based at least in part on a speech-to-text analysis of at least a portion of the audio recording.

3. The one or more computer readable media of claim 1, further comprising organizing a collaborative reading of the text-based work by the plurality of human readers, wherein each human reader is assigned to read one or more content sections of the text-based work.

4. The one or more computer readable media of claim 1, the acts further comprising determining, based on the metadata, a supplementation status of the text-based work, wherein the supplementation status is indicative of at least one additional content section, in a remainder of the text-based work, without a corresponding audio reading.

5. A computer implemented method, comprising:
   receiving a group of audio recordings from a plurality of human readers for storage on a server, individual ones of the group of audio recordings including metadata that provides identification information and identifies a respective location within a corresponding section of a text-based work;
   identifying a set of audio recordings from the group of audio recordings as corresponding to the text-based work based at least on the metadata; and
   combining the set of audio recordings to produce an audio reading including at least one audio file for at least a portion of the text-based work by digitally splicing the set of audio recordings in an order based at least in part on the respective location identified by the metadata of the set of audio recordings.

6. The computer implemented method of claim 5, further comprising integrating the audio reading with the text-based work to produce an integrated product.

7. The computer implemented method of claim 6, further comprising distributing the integrated product to one or more users.

8. The computer implemented method of claim 5, further comprising organizing a collaborative reading of the text-based work by the plurality of human readers, wherein each human reader is assigned to read one or more content sections of the text-based work.

9. The computer implemented method of claim 5, further comprising analyzing spoken words included in an audio recording to determine whether spoken words in the audio reading match at least a threshold amount of text in a corresponding content section of the text-based work based at least in part on a speech-to-text analysis of at least a portion of the audio recording, wherein the receiving includes storing the audio recording when the spoken words match at least the threshold amount of the text in the corresponding content section.

10. The computer implemented method of claim 5, wherein the identifying further includes identifying an audio recording as corresponding to a content section of the text-based work based on metadata about the audio recording, the metadata being assigned by a server to the audio recording of the text-based work, provided by a human reader with a submission of the audio recording, or obtained from a speech-to-text association of the audio recording to a corresponding content section of the text-based work.

11. The computer implemented method of claim 5, wherein multiple audio recordings in the group correspond to a content section of the text-based work, and further comprising selecting one of the multiple audio recordings for inclusion in the set of audio recordings based at least in part on user ratings of the multiple audio recordings.

12. The computer implemented method of claim 11, wherein the selecting further includes selecting one of the multiple audio recordings based at least in part on user ratings of the multiple audio recordings and continuity of each audio recording in relation to other audio recordings in the set of audio recordings.

13. The computer implemented method of claim 5, wherein multiple audio recordings include overlapping sections that correspond to a content section of the text-based work, further comprising discarding one of the overlapping sections prior to including the multiple audio recordings in the set of audio recordings.

14. The computer implemented method of claim 13, wherein the discarding further includes discarding one of the overlapping sections based at least in part on at least one of user ratings of the multiple audio recordings or continuity of each audio recording in relation to other audio recordings in the set.

15. The computer implemented method of claim 14, wherein the user ratings are numerical ratings according to a standardized rating scale.

16. A server, comprising:
   a processor; and
   memory storing components executable by the processor, the components comprising:

a content presentation component that presents a text-based work that includes a content section without a corresponding audio reading to solicit an audio reading of the content section;

an audio collection component to receive the audio reading of the content section from a human reader, the audio reading of the content section including metadata that identifies the audio reading as corresponding to the content section and that identifies a location within the content section; and an integration component to digitally splice the audio reading with an additional audio reading of another content section of the text-based work in response to determining, based at least on the metadata and additional metadata that is associated with the additional audio reading, that the audio reading and the additional reading are related, wherein an order in which the audio reading is digitally spliced with the additional audio reading is based at least in part on the location identified by the metadata.

17. The server of claim 16, wherein the content presentation component selects the text-based work for presentation to a human reader based on a purchase history of the human reader.

18. The server of claim 16, wherein the content presentation component selects the text-based work for presentation to a human reader based on a percentage of the text-based work having corresponding audio readings exceeding a predetermined threshold.

19. The server of claim 16, where the content presentation component selects the text-based work for presentation to a human reader based on one or more of a demand for the audio reading of the text-based work and a user profile of the human reader.

20. The server of claim 19, wherein the user profile includes information on one or more of a gender of the human reader, a genre of work preferred by the human reader, or voice characteristics of the human reader.

21. The server of claim 19, wherein the user profile includes information on one or more of voice characteristics, including at least one of a tone, pitch, resonance, and vocal range of the human reader.

22. The server of claim 16, wherein the content presentation component presents the text-based work with an indicator that indicates a percentage of the text-based work having corresponding audio readings.

23. One or more computer readable media storing computer-executable instructions that, when executed, cause one or more processors to perform acts comprising:

receiving an audio reading for a content section of a text-based work from a human reader, the audio reading including metadata identifying a location within the content section;

determining whether spoken words in the audio reading match at least a threshold amount of text in the content section based at least in part on a speech-to-text analysis of at least a portion of the audio reading;

storing the audio reading in a data store when the spoken words at least match the threshold amount of the text in the content section;

prompting the human reader to submit a repeat audio reading of at least a portion of the content section when the spoken words fail to match at least the threshold amount of the text in the content section; and combining the audio reading with at least one additional audio reading, wherein an order in which the audio reading is combined with the at least one additional audio reading is based at least in part on the location identified by the metadata.

24. The one or more computer readable media of claim 23, further comprising prompting the human reader to submit an additional audio reading for a subsequent content section of the text-based work when the spoken words match at least the threshold amount of the text in the content section.

25. The one or more computer readable media of claim 23, further comprising discarding the audio reading when the spoken words fail to match at least the threshold amount of the text in the content section.

26. The one or more computer readable media of claim 23, further comprising:

combining a plurality of audio recordings in the data store to produce an audio file; and integrating the audio file with the text-based work to produce an integrated product.

27. The one or more computer readable media of claim 23, further comprising distributing the audio reading to an electronic device that presents the audio reading with a computer-generated reading of another content portion of the text-based work.

28. The one or more computer readable media of claim 23, wherein the determining further includes determining whether a background noise level exceeds a maximum noise level, and wherein the storing includes storing the audio reading when the spoken words match at least the threshold amount of the text in the content section and the background noise level does not exceed the maximum noise level.

29. The one or more computer readable media of claim 23, wherein the threshold amount of text is a minimal quantity of the spoken words or a predetermined minimal word match threshold between the spoken words in the audio reading and written words of the text in the content section.

30. The one or more computer readable media of claim 23, further comprising:

determining whether the spoken words in the audio reading includes at least one added inappropriate word that is not present in the text of the content section; and discarding the audio reading when the spoken words includes the at least one added inappropriate word, wherein the storing includes storing the audio reading in the data store when the spoken words at least match the threshold amount of text in the content section and no added inappropriate word is included in the audio reading.

* * * * *